US009977898B1

(12) United States Patent
Folco et al.

(10) Patent No.: US 9,977,898 B1
(45) Date of Patent: May 22, 2018

(54) IDENTIFICATION AND RECOVERY OF VULNERABLE CONTAINERS

(71) Applicant: International Business Machines Corporation, Armonk, NY (US)

(72) Inventors: Rafael Camarda Silva Folco, Santa Barbara d'Oeste (BR); Breno H. Leitao, Jardim Guanabara Campinas (BR); Desnes A. Nunes do Rosario, Pinheiros (BR)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/338,911

(22) Filed: Oct. 31, 2016

(51) Int. Cl.
*G06F 12/14* (2006.01)
*H04L 29/06* (2006.01)
*G06F 11/30* (2006.01)
*G06F 21/55* (2013.01)
*G06F 21/56* (2013.01)

(52) U.S. Cl.
CPC .......... *G06F 21/554* (2013.01); *G06F 21/568* (2013.01); *G06F 2221/033* (2013.01)

(58) Field of Classification Search
CPC . G06F 21/554; G06F 21/568; G06F 2221/033
USPC .................................. 726/23; 713/164, 188
See application file for complete search history.

(56) References Cited

U.S. PATENT DOCUMENTS

| 9,043,922 B1 | 5/2015 | Dumitras et al. |
| 9,098,697 B2 | 8/2015 | Yablokov et al. |
| 9,098,698 B2 | 8/2015 | Ghosh et al. |
| 9,794,287 B1* | 10/2017 | Koster ................ H04L 63/1491 |
| 2002/0133487 A1* | 9/2002 | Oshins .................. G06F 9/4411 |
| 2008/0148048 A1* | 6/2008 | Govil ...................... G06F 21/53 713/164 |
| 2010/0031086 A1* | 2/2010 | Leppard .............. G06F 11/2094 714/15 |
| 2010/0306544 A1* | 12/2010 | Lionetti ................. H04L 9/083 713/171 |
| 2013/0019306 A1* | 1/2013 | Lagar-Cavilla ....... G06F 21/566 726/22 |

(Continued)

FOREIGN PATENT DOCUMENTS

CN           104038466           9/2014

OTHER PUBLICATIONS

Abed et al., Intrusion Detection System for Applications Using Linux Containers, Dec. 9, 2015, vol. 9331 of the series of lecture notes in computer science.

(Continued)

*Primary Examiner* — Aravind K Moorthy
(74) *Attorney, Agent, or Firm* — Lieberman & Brandsdorfer, LLC

(57) ABSTRACT

The present embodiments relate to security in a virtualized operating system environment with an active host based Intrusion Detection System (IDS). More specifically, the IDS identifies any infected container operating on the shared kernel and remedies the infected container. In an operating system virtualization, one or more containers are started in virtual memory utilizing the same operating system kernel. When a container starts any resource not specified in the container configuration is shared with the host operating system. The shared IDS provides security of the namespaces of all containers operating on the shared kernel.

20 Claims, 5 Drawing Sheets

(56) References Cited

U.S. PATENT DOCUMENTS

| | | | |
|---|---|---|---|
| 2013/0326626 A1* | 12/2013 | Martynenko | G06F 21/55 |
| | | | 726/24 |
| 2014/0181518 A1* | 6/2014 | Kim | G06F 21/6281 |
| | | | 713/168 |
| 2014/0259169 A1* | 9/2014 | Harrison | G06F 21/554 |
| | | | 726/23 |
| 2014/0344933 A1 | 11/2014 | Huh et al. | |
| 2015/0089654 A1* | 3/2015 | Yu | G06F 21/568 |
| | | | 726/23 |
| 2016/0117116 A1* | 4/2016 | Lee | G06F 3/0608 |
| | | | 711/104 |
| 2016/0381058 A1* | 12/2016 | Antony | H04L 63/1425 |
| | | | 726/23 |
| 2017/0230389 A1* | 8/2017 | Cochenour | H04L 63/1425 |

OTHER PUBLICATIONS

Saravanan et al., Container Architecture for Detection and Prevention of Intrusions using Virtualization Technique, Proc. of the Intl. Conf. on Advances in Computer Science and Electronics Engineering, 2013, pp. 100-104.

Mathew et al., Securing Cloud from Attacks based on Intrusion Detection System, International journal of Advanced Research in Computer and Communication Engineering, vol. 1, Issue 10, Dec. 2012.

Hassani et al., A Collaborative Intrusion detection and Prevention System in Cloud Computing, Sep. 2013.

\* cited by examiner

IDENTIFICATION AND RECOVERY OF VULNERABLE CONTAINERS

BACKGROUND

The present embodiments relate to security in a virtualized operating system environment with an active host based Intrusion Detection System (IDS). More specifically, the IDS functions to identify an infection operating on the shared operating system kernel, and to provide a remedy to the identified infection.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Cloud service models such as Software as Service (SaaS), Infrastructure as Service (IaaS) and Platform as a Service (PaaS) are relied on by developers and entry level users in daily activities. At the same time, as the demand for cloud services rises, there is an increased demand for security in the cloud.

Hardware virtualization requires each virtual machine to have an instance of the operating system, including its own kernel. A container in the cloud computing model effectively partitions resources managed by a single operating system into isolated groups. Operating system virtualization permits containers to allow execution of multiple isolated user instances on a single operating system having a single kernel.

By employing container partitioning, an operating system provides applications the illusion of running on a separate machine while at the same time sharing underlying resources. For example, the page cache of a common file (i.e. "glibc") may effectively be shared by two or more containers using the same kernel. Depending on the container configuration, these containers may frequent the same library (i.e. "libc"). This example of resource sharing can extend to files in directories that are the subject of read and write operations. However, it is understood that by enabling the sharing in this manner, containers may be subject to security vulnerabilities that aim to take control of the root user and/or solicit unauthorized container access. Accordingly, there is a need to address security in the virtualized operating system environment.

SUMMARY

A system, computer program product, and method are provided to provide security in a virtualized operating system environment with an active host based Intrusion Detection System (IDS).

In one aspect, a computer system is provided with a processing unit in communication with a memory, and a host operating system in communication with the processing unit. The host operating system has a shared kernel to provide security in a virtualized operating system environment. The shared kernel includes a management unit and an infection detection system. The management unit determines at least two software containers utilizing the shared kernel of the host operating system. Each of the containers is provided with a unique namespace. Additionally, a process of a container is stored as a memory page in data storage. The infection detection system scans a memory page in data storage and compares the scanned page to at least one prior version of the scanned page in order to detect an infection. The detected infection is utilized to identify at least one container as an infected container. The identified infected container undergoes a remedial action such as a cleaning of the infected container or a disabling of the infected container.

In another aspect, a computer program product is provided for security in a virtualized operating system environment. The computer program product includes a computer readable storage device with embodied program code that is configured to be executed by a processing unit. At least two software containers are determined utilizing the shared kernel of the host operating system. Each of the containers is provided with a unique namespace. Additionally, a process of a container is stored as a memory page in data storage. An infection detection system is configured to scan a memory page in data storage and compare the scanned page to at least one prior version of the scanned page in order to detect an infection. The detected infection is utilized to identify at least one container as an infected container. The identified infected container undergoes a remedial action such as a cleaning of the infected container or a disabling of the infected container.

In yet another aspect, a method is provided for security in a virtualized operating system environment. At least two software containers are determined utilizing the shared kernel of the host operating system. Each of the containers is provided with a unique namespace. Additionally, a process of a container is stored as a memory page in data storage. An infection detection system is configured to scan a memory page in data storage and compare the scanned page to at least one prior version of the scanned page in order to detect an infection. The detected infection is utilized to identify at least one container as an infected container. The identified infected container undergoes a remedial action such as a cleaning of the infected container or a disabling of the infected container.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

The system, method and computer program product described herein provide security in a virtualized operating system environment with an active host based Intrusion Detection System (IDS) installed on the shared operating system kernel, hereinafter referred to as a shared kernel. Whenever the IDS identifies an infected container operating on the shared kernel, the IDS remedies the container including cleaning the infected container and disabling the infected container.

In an operating system virtualization, one or more containers are started in virtual memory utilizing the same host operating system kernel. When a container starts any resource not specified in the container configuration is shared with the host operating system. This configuration enables compact specification of the differences between the container and the host operating system. The container normally operates within its own process space on the shared operating system kernel. In this space the container is isolated from other containers. The container performs a task such as but not limited to install a package, run an application, run a process, run a service, and run as a root operator. Accordingly, multiple containers may be started in a single instance of a host operating system.

Figure 1:
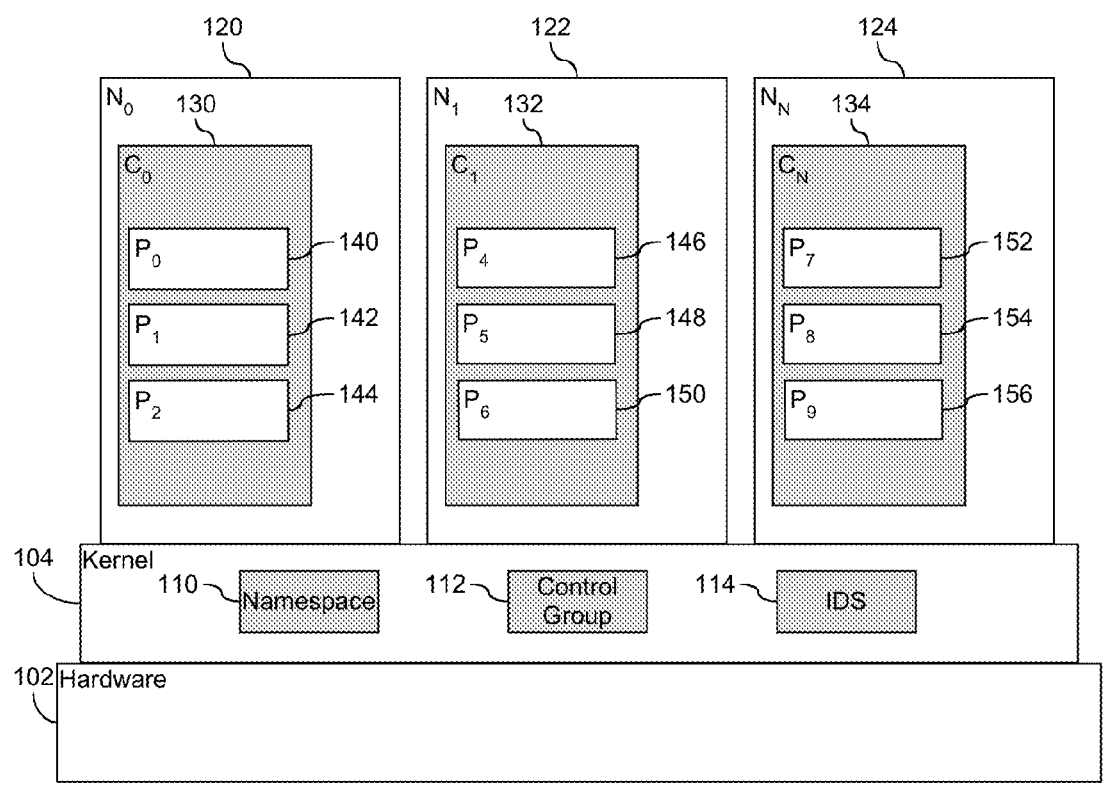
FIG. 1 depicts a block diagram illustrating an embodiment of an operating system virtualization with an IDS on the shared kernel.

Referring to FIG. 1, a diagram (100) is provided illustrating an embodiment of an operating system virtualization with an IDS on the shared kernel. As shown, hardware (102) is configured to provide resources for a host operating system (i.e. hypervisor). The kernel (104) of the host operating system is initialized utilizing resources from hardware (102). In one embodiment, a plurality of operating systems having kernels are started using resources from hardware (102). The kernel (104) is configured to enable containerization of processes within containers in virtual memory. The kernel configuration includes a namespace (110) in order to support containerization of items such as but not limited to a process, application and user. The namespace (110) of kernel (104) may contain but is not limited to the following namespaces Unix Time Sharing System (UTS), Inter-Process Communications (IPC), Process Identifier (PID), network, User Identifier and combinations thereof. Additionally, the configuration of kernel (104) includes a control group (112) to monitor and limit resources of hardware (102) required by each process. Accordingly, the namespace and control group provides management and control of containers on the shared kernel.

Further, the kernel configuration includes tools which may be but are not limited to a management unit, container tools, network interface tools, network configuration tools, filesystem population tools, and container connection tools. The tools may provide the ability to but not limited to; list, i.e. to show processes that are a part of a container; signal, i.e. to send a signal to all processes running inside a container; pause, i.e. to freeze all processes in a container; resume, i.e. to resume a frozen container; stop, i.e. to stop all processes in the started container and clean up the container; destroy, i.e. to destroy the container, remove the configuration and metadata associated with the container namespace. Accordingly, the kernel configuration is provided with tools to create, manage, and remove containers on the shared kernel.

Following initialization of kernel (104), container, $C_0$ (130), is started in namespace (120) on the kernel (104) in virtual memory. Similarly, Container, $C_1$ (132), is started in namespace (122) on the kernel (104) in virtual memory. In one embodiment, N containers are started in a namespace on kernel (104), including container, $C_N$ (134) started in namespace (124) on kernel (104) in virtual memory. The quantity of containers and processes shown is for illustration only and should not be considered limiting. For example, container, $C_0$ (130), contains processes, (140), (142) and (144), container, $C_1$ (132), contains processes, (146), (148) and (150), and container, $C_2$ (134), contains processes, (152), (154) and (156). The processes (140)-(156) may be but are not limited to different processes, different instances of the same process, and combinations thereof. Accordingly, a plurality of containers each having processes are started on the same shared kernel.

An IDS (114) is installed in the kernel (104) in order to provide security for any container started on the kernel (104). The IDS operates by scanning a memory page, hereinafter page, utilized by a process in a container or utilized by a process of the host operating system. A memory page is a unit of data in a contiguous block of virtual memory, described by a single entry in a page table of the host operating system. A page is stored in the virtual memory and a virtual memory manager points to the real memory location. The IDS is configured to provide but is not limited to knowledge-based (Signature-based) detection, and behavior-based (Anomaly-based) detection. Knowledge-based detection compares a page utilized by a process to a previous infection signature and known system vulnerabilities. Behavior-based detection compares a page utilized by a process to a known baseline of the page or a learned pattern of normal system activity in order to identify an infection. Behavior-based detection may determine but is not limited to a failed attempt to run an application, and access to a forbidden file. The IDS is configured to enable a scan of each container for an infection. When the IDS determines a container is infected, the IDS performs a remediation of the infected container. In one embodiment the IDS is snort. Accordingly, the IDS provides security for the host operating system and the containers operating on the host operating system.

In one embodiment, a virtualized guest operating system having a virtualized guest kernel is initialized on kernel (104) of the host operating system. Two containers are started on the guest kernel. An IDS is installed on the guest kernel to provide monitoring of the two containers started on the guest kernel. Accordingly, the IDS may be deployed on a virtualized guest operating system.

Figure 2:
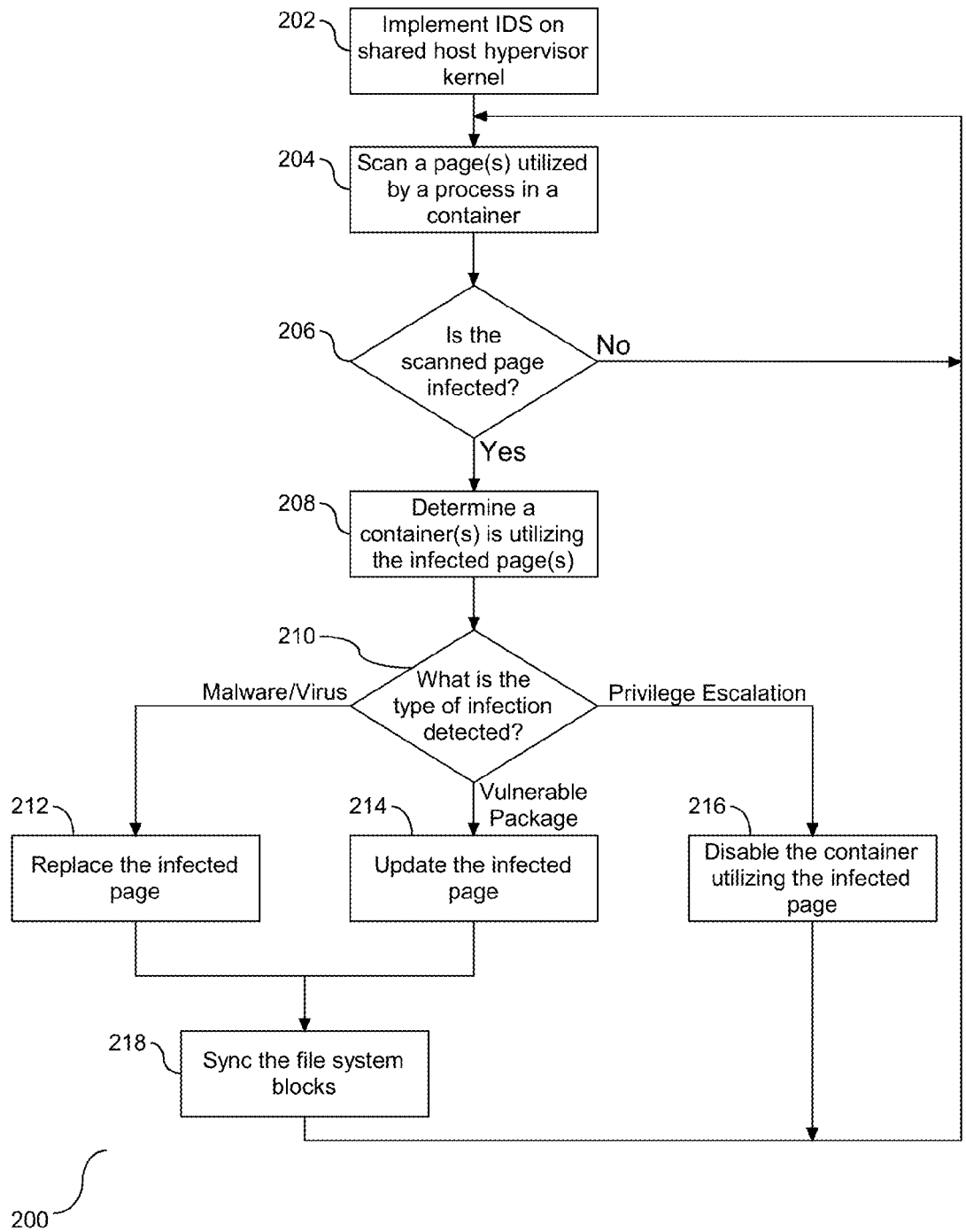
FIG. 2 depicts a flow chart illustrating a process for monitoring containers on a shared kernel.

The IDS installed on a shared host hypervisor kernel enables monitoring of any container started on the shared host hypervisor kernel. Referring to FIG. 2, a flow chart (200) is provided illustrating a process for monitoring containers on a shared host hypervisor kernel. As shown, an IDS is implemented on a shared host hypervisor kernel (202). The IDS accesses the virtual memory utilized by the containers and sequentially scans any page utilized by a process contained in a container operating on the shared kernel (204). In one embodiment, the IDS starts scanning any page that is shared by multiple containers or are similar between multiple containers before scanning any page that is only utilized by a single container. Accordingly, scanning shared or similar memory pages enables parallel scanning of processes utilized between multiple containers.

During the scan, the IDS determines if the scanned page is infected (206). In one embodiment, the IDS uses knowledge-based detection, anomaly based detection or a combination thereof. In order to make the determination the IDS examines the content of the scanned page and compares it to a known signature of an infection and/or a baseline for the page. In one embodiment, the known signature of an infection is stored in a data storage and the data storage is accessed by the IDS for the comparison. In one embodiment, the data storage of known signatures is updated periodically. Accordingly, the IDS scans a page and determines if the page is infected.

If the answer at step (206) is negative, i.e. the page is not infected, the IDS continues to sequentially scan pages as in step (204). However, if the answer at step (206) is positive, i.e. the page is infected, the IDS proceeds to determine any container utilizing the infected page (208). The infected container(s) is determined based on determining any container having a process utilizing the infected page. In one embodiment, the namespace of the shared kernel is utilized in making a determination of the infected container. After determination of the infected container a determination of the type of infection detected by the IDS is performed (210). The infection type may be but is not limited to a malware, virus, vulnerable software, vulnerable package and privilege escalation attack. Accordingly, the IDS determines an infected container based on a scanned infected page and the type of infection the container is undergoing.

The process for the infection remediation is based on the determined infection type. For instance, if the infection was determined to be a malware, virus or other problem in the virtual memory utilized by any process of any container on the shared kernel the infected page is replaced in the virtual memory (212). In one embodiment, the page is replaced by performing a "hot swap", where the infected page is removed and an uninfected version of the infected page is added in place of the infected page while the process is running without requiring a restart of the process utilizing the infected page. In one embodiment, a "cold swap" is performed where the application is restarted in order to remove the infected page and add an uninfected version in place of the infected page. In one embodiment, the container is already offline when the infected page is found and the infected page is removed and an uninfected version of the infected page is added in place of the infected page while the container is offline. Additionally, the pointers in the process referring to the infected page are changed to the uninfected version of the page that was added. Following step (212), the file system blocks are synced wherein the virtual memory location pointers are updated to refer to the correct physical memory location (218). Accordingly, the IDS may perform a hot or cold swap of an infected page with an uninfected version of the page.

On the other hand, if the infection was determined to be a known vulnerability which can be exploited to provide unwanted access to the operating system and/or containers, such as but not limited to a vulnerable process or package, the page is updated (214). During the update, the IDS replaces the infected page with a known vulnerability with an updated version of the infected page without the known vulnerability. The pointers in the process referring to the infected page are changed to the updated page. In one embodiment, the IDS searches a data storage for an updated version of the infected page without the known vulnerability. The data storage may be a data storage device configured to retain strings and program code. Following step (214) the file system blocks are synced wherein the virtual memory location pointers are updated to refer to the correct physical memory location (218). Accordingly, as demonstrated infected pages with known vulnerabilities are found by the IDS and updated to remove the known vulnerability.

Correspondingly, if the infection was determined to be a privilege escalation attempt the infected container is disabled (216). The IDS may disable the container by suspension of the namespace the container belongs to utilizing the namespace on the shared kernel. In one embodiment, the namespace of the process may be suspended. In one embodiment, a notification is generated to provide an alert of the privilege escalation attempt. In one embodiment, the privilege escalation attempt was not complete and a memory page(s) can be replaced without having to disable the container. In one embodiment, after the container is disabled a new container is started with the same configuration as the disabled container. Accordingly, a privilege escalation attempt is found by the IDS and the container originating the privilege escalation attempt is disabled.

In one embodiment, during a scan of the memory, the IDS may enable Kernel Same-Page Merging (KSM). KSM enables sharing of identical pages among different processes between different containers. For instance, two identical pages can be merged into a single page to be shared by two processes which may be in one or more different containers. By sharing pages, the scan time by the IDS is reduced since fewer pages need to scan in a full system scan. The shared pages enable parallel remediation of containers and faster remediation times of an infection. Only a single shared page utilized by multiple containers would need to be remedied instead of multiple identical copies of an infected page each utilized by a different container. Accordingly, Kernel Same-Page Merging provides faster scan rates and parallel remediation of an infection.

Following remediation of the infected page at steps (216) and (218) the process returns to step (204) to continue the sequential scanning of pages. In one embodiment, the process stops after all pages have been scanned. In one embodiment, the process re-starts the scan after all pages have been scanned. Accordingly, a single IDS on a shared kernel provides detection and remediation of an infected container.

In one embodiment, the infection detection on a shared kernel would be provided as a Platform as a Service (PaaS) wherein the user uses the container and the service provider implements the infection detection.

Aspects of increasing security in a virtualized operating system environment with an active host based Intrusion Detection System (IDS) provided in FIGS. 1-2, employ one or more functional tools to support use of security in a virtualized operating system environment. Aspects of the functional tools and their associated functionality may be embodied in a computer system/server in a single location, or in one embodiment, may be configured in a cloud based system sharing computing resources. With references to FIG. 3, a block diagram (300) is provided illustrating an example of a computer system/server (302), hereinafter referred to as a host (302) in communication with a cloud based support system, to implement the processes described above with respect to FIG. 2. Host (302) is operational with numerous other general purpose or special purpose computing system environments or configurations. Examples of well-known computing systems, environments, and/or configurations that may be suitable for use with host (302) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (302) may be described in the general context of computer system-executable instructions, such as program modules, being executed by a computer system. Generally, program modules may include routines, programs, objects, components, logic, data structures, and so on that perform particular tasks or implement particular abstract data types. Host (302) may be practiced in distributed cloud computing environments where tasks are performed by remote processing devices that are linked through a communications network. In a distributed cloud computing environment, program modules may be located in both local and remote computer system storage media including memory storage devices.

Figure 3:
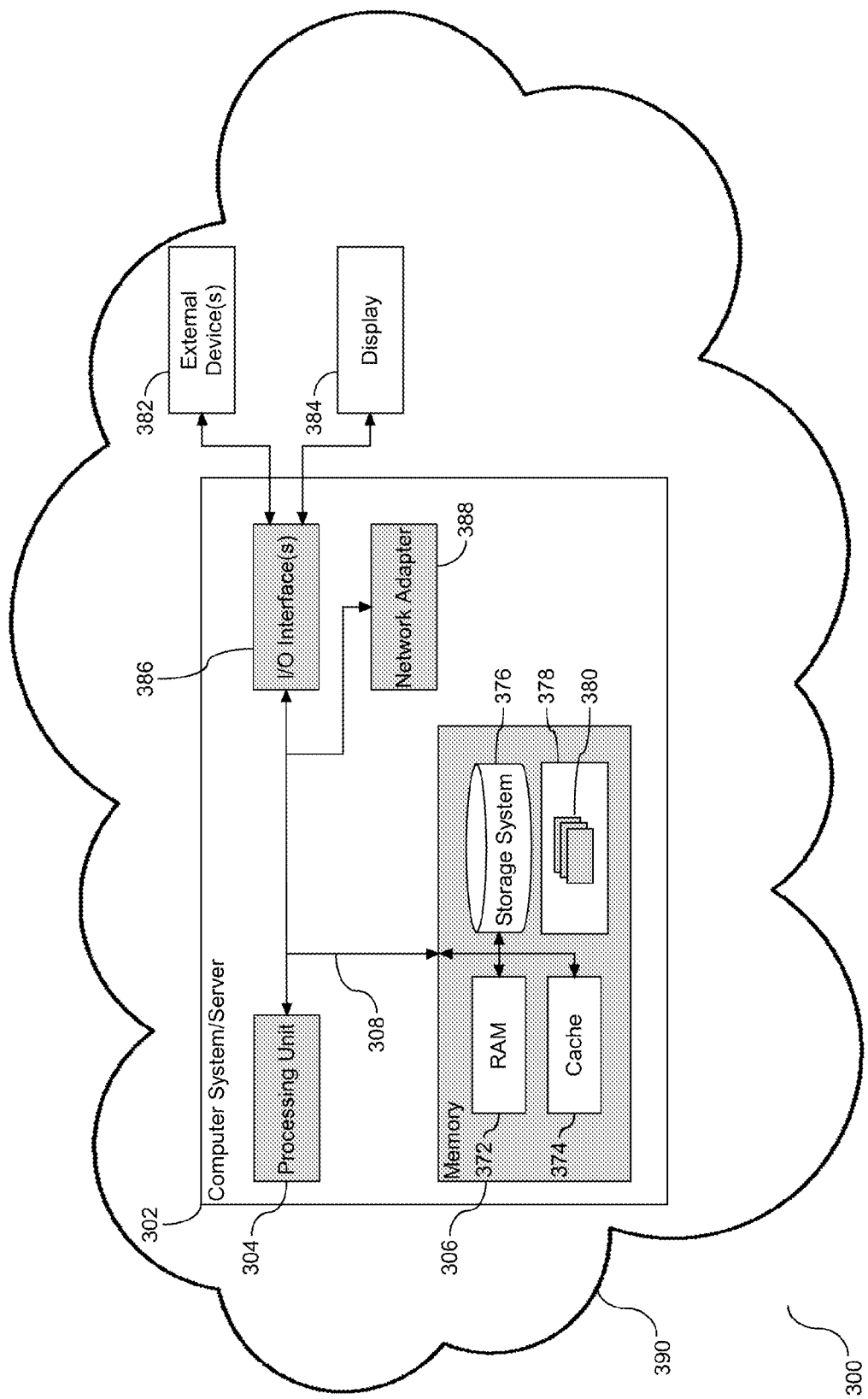
FIG. 3 is a block diagram illustrating an example of a computer system/server of a cloud based support system, to implement the process described above with respect to FIG. 2.

As shown in FIG. 3, host (302) is shown in the form of a general-purpose computing device. The components of host (302) may include, but are not limited to, one or more processors or processing units (304), a system memory (306), and a bus (308) that couples various system components including system memory (306) to processor (304). Bus (308) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (302) typically includes a variety of computer system readable media. Such media may be any available media that is accessible by host (302) and it includes both volatile and non-volatile media, removable and non-removable media.

Memory (306) can include computer system readable media in the form of volatile memory, such as random access memory (RAM) (372) and/or cache memory (374). By way of example only, storage system (376) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (308) by one or more data media interfaces.

Program/utility (378), having a set (at least one) of program modules (380), may be stored in memory (306) by way of example, and not limitation, as well as an operating system, one or more application programs, other program modules, and program data. Each of the operating systems, one or more application programs, other program modules, and program data or some combination thereof, may include an implementation of a networking environment. Program modules (380) generally carry out the functions and/or methodologies of embodiments to store and analyze data. For example, the set of program modules (380) may include the modules configured as a functional tool(s) in order to provide security in a virtualized operating system environment with an active host based Intrusion Detection System (IDS) as described in FIGS. 1-2.

Host (302) may also communicate with one or more external devices (382), such as a keyboard, a pointing device, etc.; a display (384); one or more devices that enable a user to interact with host (302); and/or any devices (e.g., network card, modem, etc.) that enable host (302) to communicate with one or more other computing devices. Such communication can occur via Input/Output (I/O) interface(s) (386). Still yet, host (302) can communicate with one or more networks such as a local area network (LAN), a general wide area network (WAN), and/or a public network (e.g., the Internet) via network adapter (388). As depicted, network adapter (388) communicates with the other components of host (302) via bus (308). In one embodiment, a plurality of nodes of a distributed file system (not shown) is in communication with the host (302) via the I/O interface (386) or via the network adapter (388). It should be understood that although not shown, other hardware and/or software components could be used in conjunction with host (302). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (306), including RAM (372), cache (374), and storage system (376), such as a removable storage drive and a hard disk installed in a hard disk drive.

Computer programs (also called computer control logic) are stored in memory (306). Computer programs may also be received via a communication interface, such as network adapter (388). Such computer programs, when run, enable the computer system to perform the features of the present embodiments as discussed herein. In particular, the computer programs, when run, enable the processing unit (304) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (302) is a node (390) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
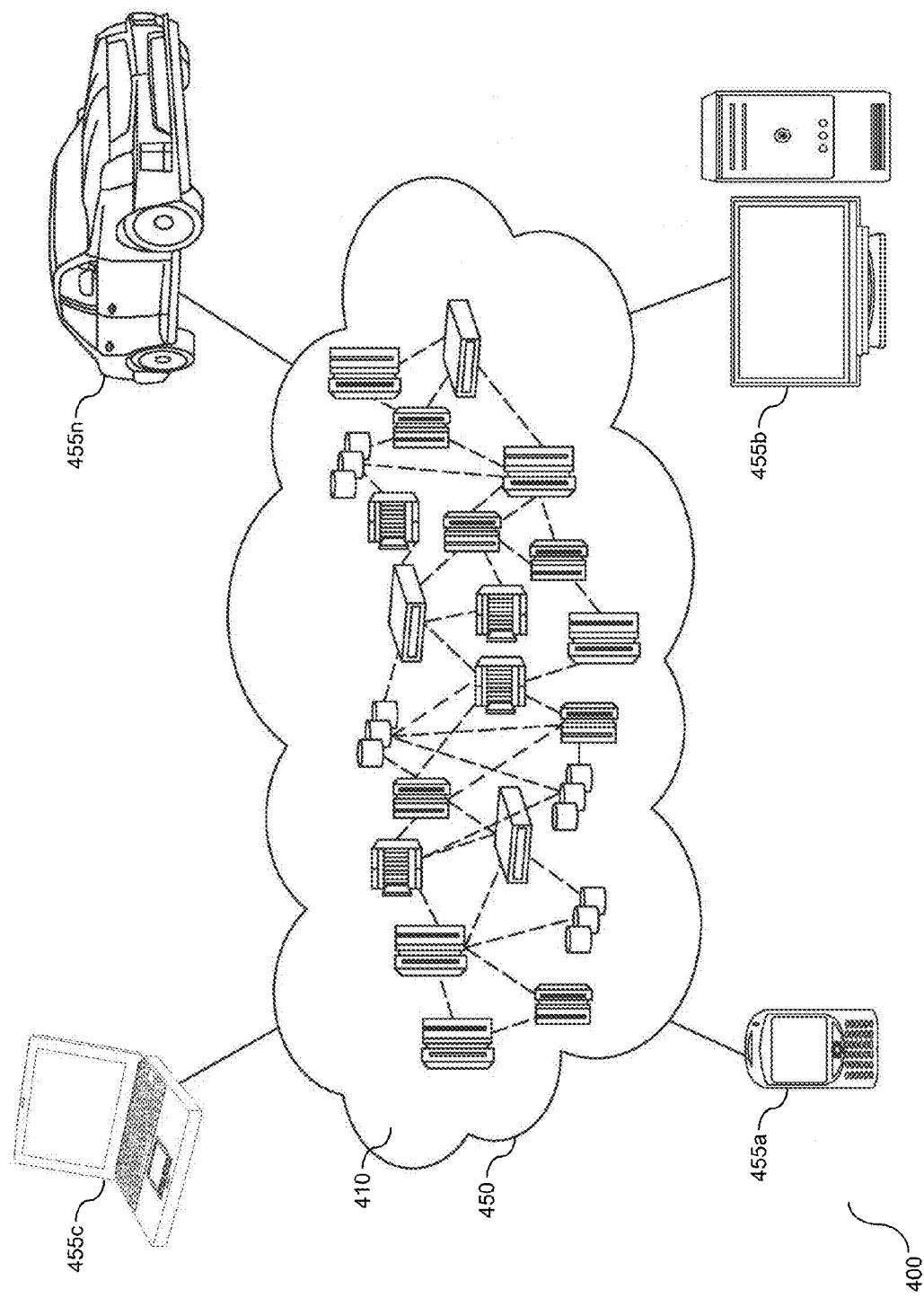
FIG. 4 depicts a block diagram illustrating a cloud computer environment.

Referring now to FIG. 4, an illustrative cloud computing network (400). As shown, cloud computing network (400) includes a cloud computing environment (450) having one or more cloud computing nodes (410) with which local computing devices used by cloud consumers may communicate. Examples of these local computing devices include, but are not limited to, personal digital assistant (PDA) or cellular telephone (455A), desktop computer (455B), laptop computer (455C), and/or automobile computer system (455N). Individual nodes within nodes (410) may further communicate with one another. They may be grouped (not shown) physically or virtually, in one or more networks, such as Private, Community, Public, or Hybrid clouds as described hereinabove, or a combination thereof. This allows cloud computing environment (400) to offer infrastructure, platforms and/or software as services for which a cloud consumer does not need to maintain resources on a local computing device. It is understood that the types of computing devices (455A-N) shown in FIG. 4 are intended to be illustrative only and that the cloud computing environment (450) can communicate with any type of computerized device over any type of network and/or network addressable connection (e.g., using a web browser).

Figure 5:
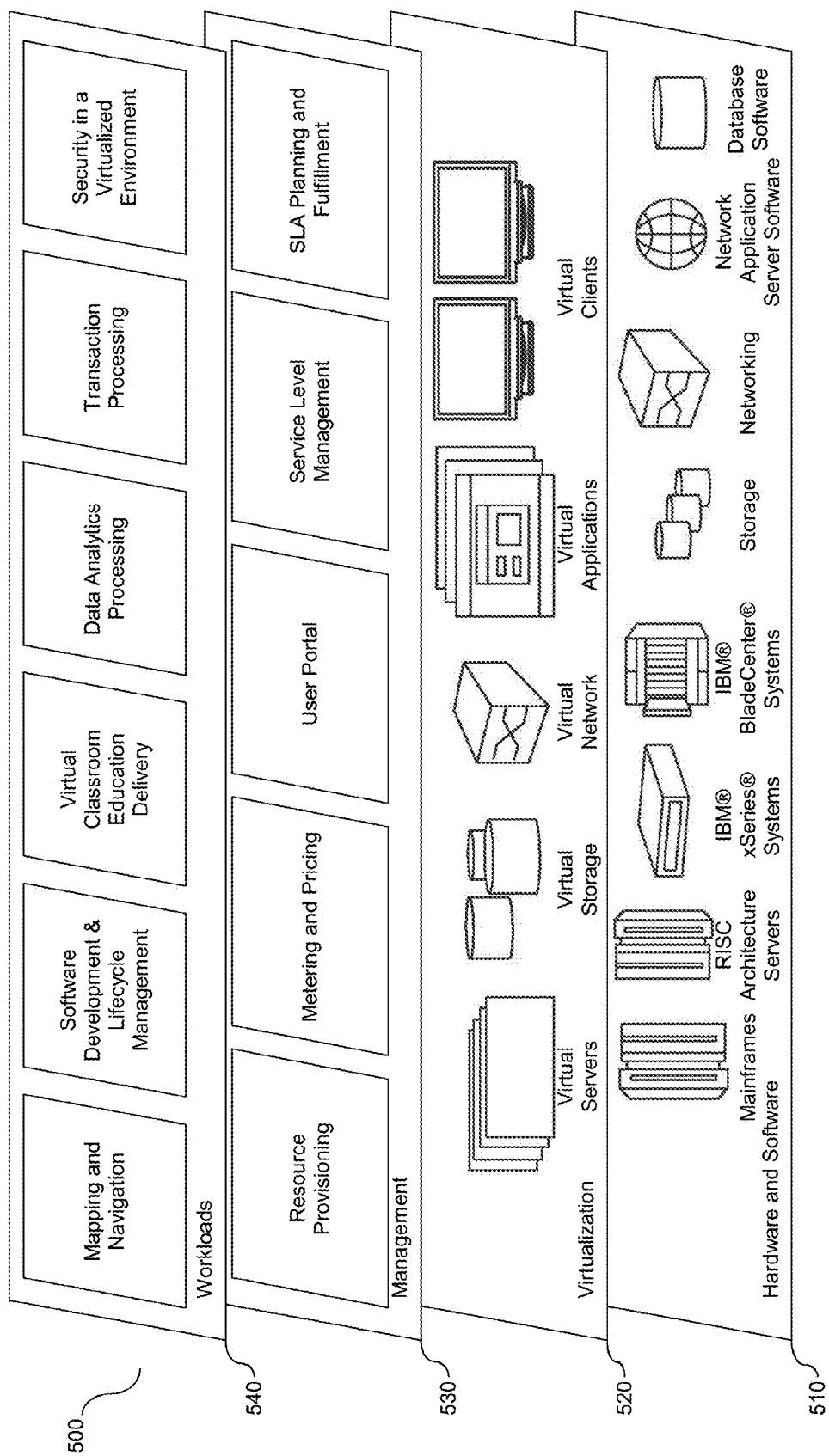
FIG. 5 depicts a block diagram illustrating a set of functional abstraction model layers provided by the cloud computing environment.

Referring now to FIG. 5, a set of functional abstraction layers provided by the cloud computing network of FIG. 3 is shown. It should be understood in advance that the components, layers, and functions shown in FIG. 5 are intended to be illustrative only, and the embodiments are not limited thereto. As depicted, the following layers and corresponding functions are provided: hardware and software layer (510), virtualization layer (520), management layer (530), and workload layer (540). The hardware and software layer (510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (520) provides an abstraction layer from which the following examples of virtual entities may be provided: virtual servers; virtual storage; virtual networks, including virtual private networks; virtual applications and operating systems; and virtual clients.

In one example, management layer (530) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and increasing security in a virtualized operating system environment with an active host based Intrusion Detection System (IDS).

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation an active host based Intrusion Detection System (IDS) in a virtualized operating system environment provides security.

It will be appreciated that, although specific embodiments have been described herein for purposes of illustration, various modifications may be made without departing from the spirit and scope of the embodiments. In particular, the number of operating system kernels should not be considered limiting. There may be a plurality of operating system kernels each with their own IDS and at least one container operating on each operating system. Accordingly, the scope of protection of these embodiments is limited only by the following claims and their equivalents.

What is claimed is:

1. A computer system comprising:
 a processing unit in communication with a memory; and
 a host operating system in communication with the processing unit having a shared kernel to provide security in a virtualized operating system environment, the shared kernel comprising:
  a management unit installed in the shared kernel, the management unit to determine at least two software containers utilizing the shared kernel of the host operating system, each container having a unique namespace; and
  an infection detection system (IDS) installed in the shared kernel, the IDS to:
   scan a memory page in virtual memory utilized by a container process;
   detect an infection of at least one the scanned page;
   identify at least one of the containers as an infected container utilizing the detected infection and identify an infection type; and
   remedy the identified infected container local to the kernel.

2. The system of claim 1, further comprising the IDS to remedy the infected container with a remedial action of cleaning the infected container, including the IDS to:
 identify an infected page exposed to the detected infection;
 remove the infected page from data storage;
 replace the infected page with a non-infected version of the page; and
 change a reference pointer directed to the infected page to the non-infected page.

3. The system of claim 2, further comprising the management unit to restart the cleaned container in response to the infection detection system changing the reference pointer.

4. The system of claim 1, further comprising the IDS to remedy the infected container with a remedial action disabling the infected container, including the infection detection system to suspend the namespace of the infected container in the shared kernel.

5. The system of claim 1, further comprising the management unit to:
 identify at least two memory pages utilized by at least two separate containers wherein each identified memory page is a duplicate of the other; and
 eliminate at least one page of the at least two identified memory pages utilizing kernel same page merging.

6. The system of claim 1, wherein the infection detection system includes: signature based detection to compare the scanned page to a previous attack signature, and anomaly based detection to compare the scanned page to a learned pattern of system activity.

7. The system of claim 1, further comprising the infection detection system to:
 identify at least two containers as infected containers exposed to the detected infection; and
 remedy the infected containers in parallel.

8. The system of claim 1, wherein the IDS provides security to any container started on the kernel.

9. The system of claim 1, wherein remedy of the infected container further comprising the IDS to determine the infection type, wherein the infection type determined to be directed at virtual memory includes the IDS to remove an identified infected page from data storage, and wherein the infection type determined to be directed at a container includes the IDS to identify and the container.

10. A computer program product for providing security in a virtualized operating system environment, the computer program product comprising a computer readable storage device having program code embodied therewith, the program code executable by a processor to:
 determine at least two software containers utilizing a shared kernel of a host operating system, each container having a unique namespace;
 store a process of at least one container as a memory page in virtual memory; and
 configure an infection detection system in the shared kernel of the host operating system, the infection detection system including program code to:
  scan the page in the virtual memory;
  detect an infection, including compare the scanned page to at least one prior version of the scanned page;

identify at least one of the containers as an infected container utilizing the detected infection and identify an infection type; and remedy the identified infected container local to the kernel.

11. The computer program product of claim 10, wherein the program code to remedy the infected container includes a remedial action of cleaning the infected container, including program code to:

identify an infected page exposed to the detected infection;

remove the infected page from data storage;

replace the infected page with a non-infected version of the page; and change a reference pointer directed to the infected page to the non-infected page.

12. The computer program product of claim 10, wherein the program code to remedy the infected container includes a remedial action of disabling the infected container, including program code to suspend the namespace of the infected container in the shared kernel.

13. The computer program product of claim 10, further comprising program code to:

identify at least two memory pages utilized by at least two separate containers wherein each identified memory page is a duplicate of the other; and eliminate at least one page of the at least two identified memory pages utilizing kernel same page merging.

14. The computer program product of claim 10, wherein the detection of an infection includes signature based detection to compare the scanned page to a previous attack signature, and anomaly based detection to compare the scanned page to a learned pattern of system activity.

15. The computer program product of claim 10, further comprising program code to:

identify at least two containers as infected containers exposed to the detected infection; and remedy the infected containers in parallel.

16. A method comprising:

determining at least two software containers utilizing a shared kernel of a host operating system, each container having a unique namespace;

storing a process of at least one container as a memory page in virtual memory;

an infection detection system installed in the shared kernel scanning the page in the virtual memory utilized by at least one of the container, and detecting an infection;

identifying at least one of the containers as an infected container utilizing the detected infection;

identifying an infection type of the infected container; and remedying the identified infected container local to the shared kernel.

17. The method of claim 16, further comprising the infection detection system to invoked a remedial action to clean the infected container, including:

identifying an infected page exposed to the detected infection;

removing the infected page from data storage;

replacing the infected page with a non-infected version of the page; and changing a reference pointer directed to the infected page to the non-infected page.

18. The method of claim 16, further comprising:

identifying at least two memory pages utilized by at least two separate containers wherein each identified memory page is a duplicate of the other; and eliminating at least one page of the at least two identified memory pages utilizing kernel same page merging.

19. The method of claim 16, wherein the infection detecting includes: signature based detection comparing the scanned page to a previous attack signature, and anomaly based detection comparing the scanned page to a learned pattern of system activity.

20. The method of claim 16, further comprising identifying at least two containers as infected containers exposed to the detected infection and remedying the infected containers in parallel.

* * * * *